Dec. 15, 1964     F. B. PORGES     3,161,414
MECHANICAL SEALS FOR USE WITH RELATIVELY ROTATING MEMBERS
Filed April 18, 1962     2 Sheets-Sheet 1

Dec. 15, 1964 F. B. PORGES 3,161,414
MECHANICAL SEALS FOR USE WITH RELATIVELY ROTATING MEMBERS
Filed April 18, 1962 2 Sheets-Sheet 2

United States Patent Office 3,161,414
Patented Dec. 15, 1964

3,161,414
MECHANICAL SEALS FOR USE WITH RELATIVELY ROTATING MEMBERS
Frederick B. Porges, Carr Wood, Hale Barns, England, assignor to Flexibox Limited, Manchester, Lancashire, England, a British company
Filed Apr. 18, 1962, Ser. No. 188,495
Claims priority, application Great Britain, May 10, 1961, 16,967/61
3 Claims. (Cl. 277—93)

This invention relates to mechanical seals for use with relatively rotating members in which one seal ring is urged into contact with the other seal ring by spring means and has for its object to provide an improved arrangement of the components constituting the stationary or the rotary seal so that they can be readily assembled and disassembled without damage to the major components of the assembly.

In accordance with the present invention, we provide a metal cap comprising a radial part which limits the extent to which the cap can be moved onto or off seal housing around the member having a seal ring therein, with spring means between said housing and member and a cylindrical part of said cap to pass around the seal housing and having an inwardly projecting annular lip adapted to enter a recess around the seal housing before referred to, the said cylindrical part being capable of being sprung onto and off the seal housing to hold the seal assembly together and to allow it to be dismantled.

When the stationary or rotary seal unit is assembled, the metal cap is forced into position to engage and lock in the peripheral recess in the seal ring so that the parts of the assembly are secured together but can if required be disassembled by springing the metal cap away from the seal ring. In both cases, when the metal cap is sprung out of position, the seal assembly can be dismantled without damage.

Referring to the accompanying explanatory drawings.

Figure 1:
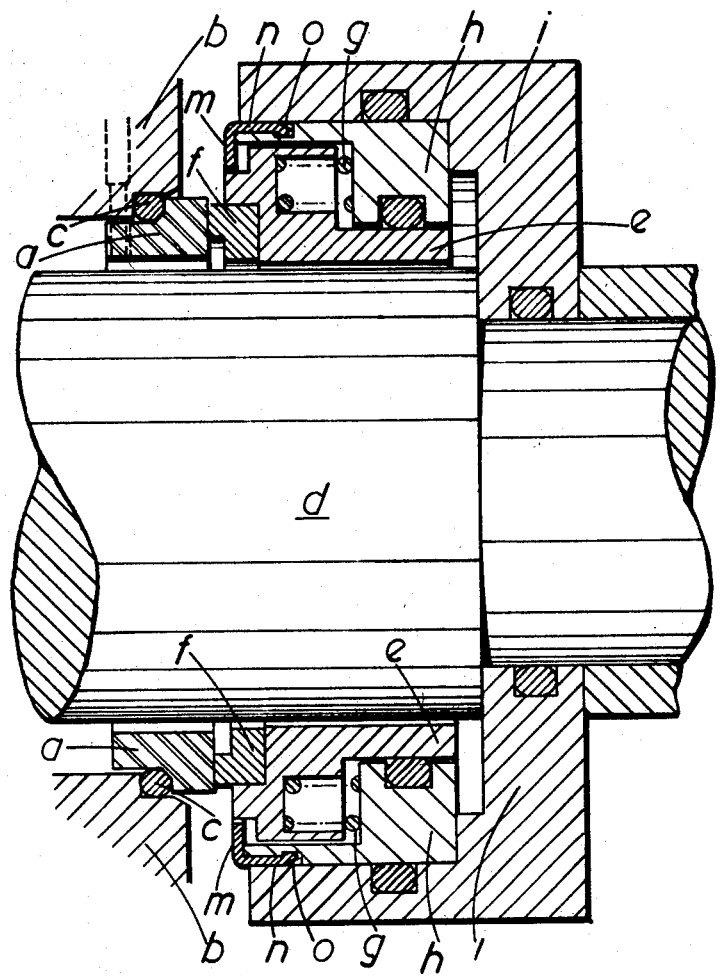
FIGURE 1 is a sectional view of a mechanical seal comprising stationary and rotary seal members in which the rotary seal member incorporates the present invention.

In FIGURE 1, $a$ indicates the stationary seal ring which makes a fluid tight joint with a frame member $b$ by means of an O-ring $c$. The seal ring is located axially around a revolving shaft $d$. The rotary seal ring assembly comprises a rotary seal ring $e$ having fixed therein a rotary seal ring insert $f$ which is pressed against the stationary seal ring $a$ by a series of coil springs $g$ located in pockets in the rotary seal ring and bearing against a seal housing $h$ within a member $i$ which rotates with the shaft $d$. It will be noted that the rotary seal ring assembly comprises essentially the seal housing $h$, the rotary seal ring $e$, the coil springs $g$ and the rotary seal ring insert $f$ fixed in the rotary seal ring $e$. In accordance with the present invention, the parts of this assembly are held together as a unit by a seal housing cap $h$ which has a radial part $m$ projecting into a peripheral recess in the seal ring $e$ and an annular part $n$ extending along an annular recess in the part $h$, with an inwardly turned part $o$ at the end of the annulus $n$ which enters a peripheral recess $p$ in the seal housing $h$. When assembling the unit, the cap $m$, $n$, is sprung on the seal housing $h$ and effectively holds the parts of the unit together. To dismantle the unit, the cap $m$, $n$ is forced off the seal housing $h$. The parts of the unit are then free to be separated for replacement or renewal purposes.

Figure 2:
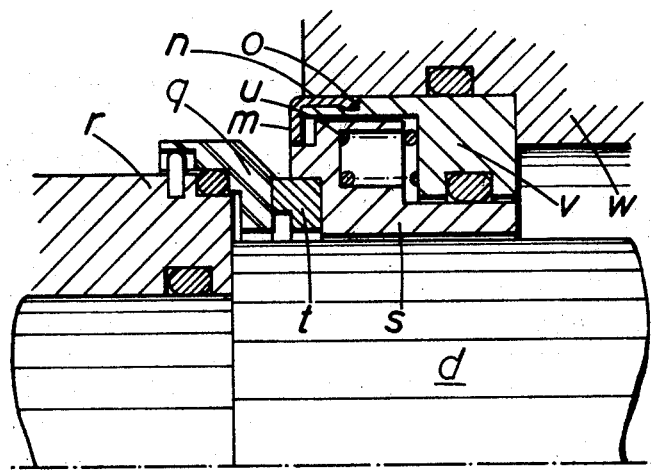
FIGURE 2 is a sectional view of part of a mechanical seal comprising stationary and rotary seal members in which the stationary seal member incorporates the present invention.
Figure 3:
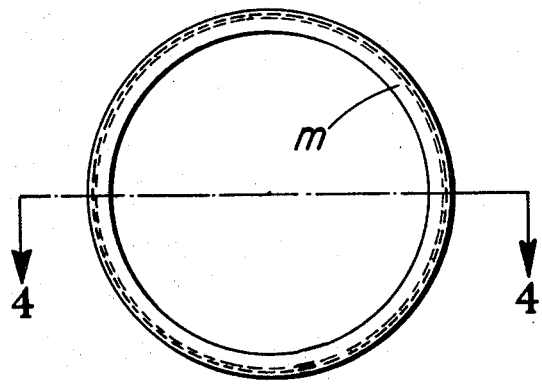
FIGURE 3 is an end view of the seal housing cap included in FIGURE 2.
Figure 4:
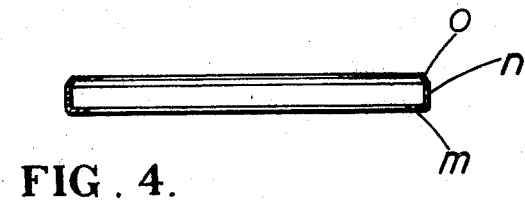
FIGURE 4 is a sectional view on the line 4—4 of the seal housing cap shown in FIGURE 3.

In FIGURES 2, 3 and 4, $q$ indicates the rotary seal ring which rotates with the sleeve $r$ secured rotatably to the shaft $d$. The stationary seal ring $s$ has a seal ring insert $t$ which is pressed against the rotary seal ring $q$ by several coil springs $u$ located in pockets in the stationary seal ring $s$ which bear at their rear ends against the seal housing $v$ in the fixed frame member $w$. The parts $s$ and $v$ with the springs $u$ between are held together as an assembly by the cap $m$, $n$ which is similar to the cap $m$, $n$ in FIGURE 1 and which is adapted to be sprung into its operative position to hold the parts of the assembly together as a unit, and to be sprung or forced off the part $v$ when the parts of the unit are to be dismantled.

What is claimed is:

1. A mechanical seal comprising a first seal ring adapted to be positioned in a frame member or the like, a second seal ring coaxially aligned with said first seal ring, a seal ring insert fixed in said second seal ring and engageable with said first seal ring, a seal housing coaxially aligned with said second seal ring, spring means between said seal housing and said second seal ring to normally urge said second seal ring toward said first seal ring, a rotary shaft extending through said first and second seal rings and said seal housing, a member mounted on said shaft, said seal housing and said second seal ring removably mounted in said member, said member, seal housing and second seal ring all being rotatable with said shaft, and a seal housing cap removably mounted in said seal housing to retain said second seal ring and said seal housing in assembled relation in the member mounted on said rotary shaft.

2. A mechanical seal as defined in claim 1, wherein said seal housing includes an axially extending portion, said second seal ring telescopingly disposed within said seal housing, pockets in said second seal ring, said spring means disposed in said pockets, portions of said axially extending portion of said seal housing defining a peripheral recess therein, said seal housing cap having a part thereof positioned in the recess, and said seal housing cap further including a radially extending portion overlying a portion of said second seal ring to limit telescoping movement thereof relative to said seal housing under bias of said spring means.

3. A mechanical seal as defined in claim 1, which further includes seal means between said seal housing and the member on said shaft and between said seal housing and said second seal ring.

References Cited by the Examiner
UNITED STATES PATENTS
2,856,219   10/58   Kosatka _____ 277—38

EDWARD V. BENHAM, Primary Examiner.